United States Patent [19]
Hodge

[11] Patent Number: 5,782,083
[45] Date of Patent: Jul. 21, 1998

[54] DRIVE SYSTEMS

[75] Inventor: Stephen Mark Hodge, Tamworth, Great Britain

[73] Assignee: Concentric Pumps Limited, Birmingham, Great Britain

[21] Appl. No.: 664,444

[22] Filed: Jun. 21, 1996

[51] Int. Cl.$^6$ ............................................. F16D 39/00
[52] U.S. Cl. ............................................. 60/487; 418/61.3
[58] Field of Search ............................ 60/487; 418/5, 418/9, 60, 61.3

[56] References Cited

U.S. PATENT DOCUMENTS

| | | | |
|---|---|---|---|
| 4,566,272 | 1/1986 | Petersen et al. | 418/61.3 X |
| 4,875,841 | 10/1989 | White, Jr. | 418/61.3 X |
| 4,951,790 | 8/1990 | Blything | 418/61.3 X |
| 5,056,994 | 10/1991 | Eisenmann et al. | 418/61.3 |

FOREIGN PATENT DOCUMENTS

| | | | |
|---|---|---|---|
| 0160652 | 9/1983 | Japan | 418/61.3 |
| 4131568 | 5/1992 | Japan | 60/487 |
| 1423806 | 9/1988 | U.S.S.R. | 418/5 |
| 2274489 | 7/1994 | United Kingdom | 418/9 |

*Primary Examiner*—Hoang Nguyen
*Attorney, Agent, or Firm*—Learman & McCulloch

[57] ABSTRACT

A hydrostatic drive comprises a motor and a gerotor pump having its annulus or its rotor axially split into two parts of unequal length, one of the two parts being angularly shiftable relative to the other to enable the drive to be shifted between forward, reverse, and neutral conditions.

6 Claims, 2 Drawing Sheets

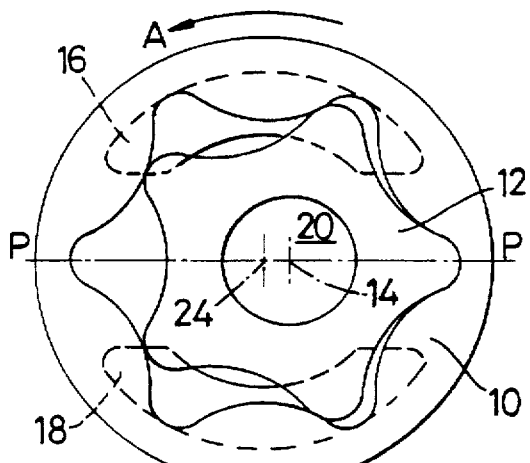
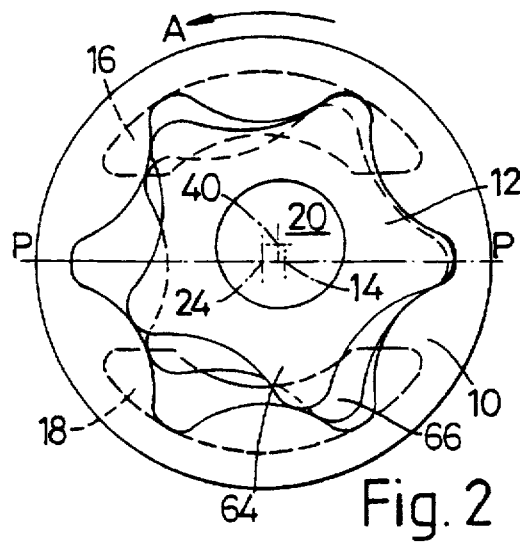
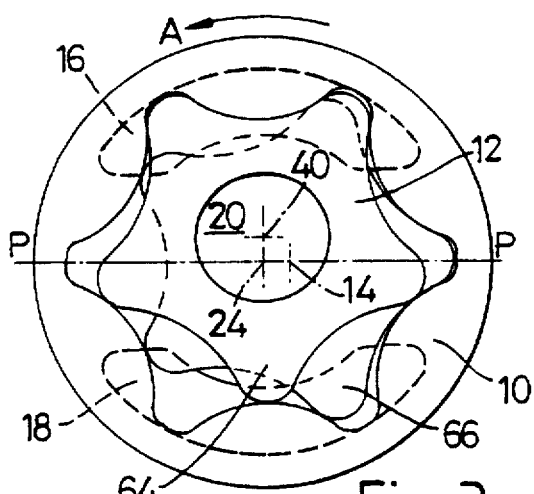
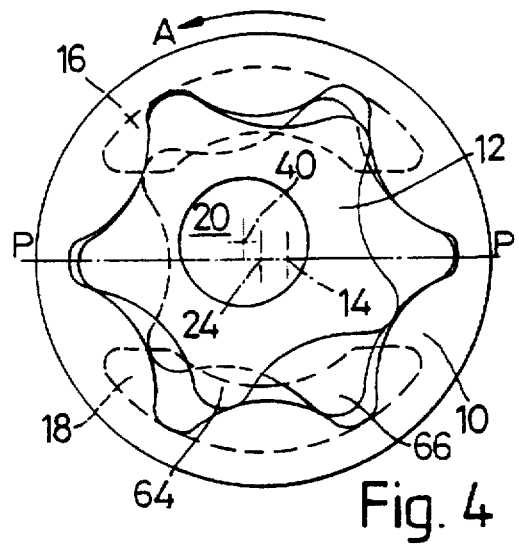
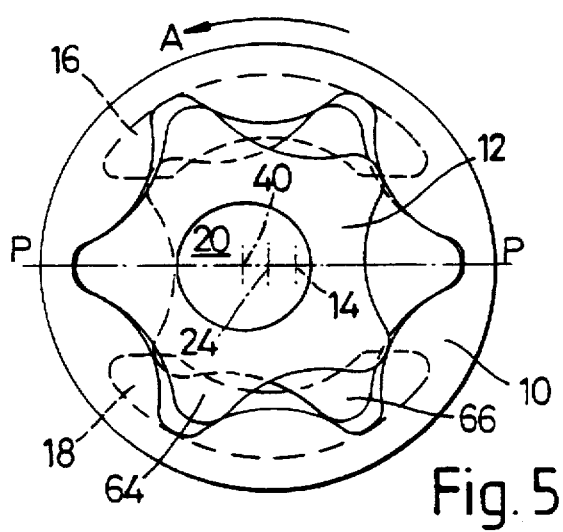

DRIVE SYSTEMS

BACKGROUND OF THE INVENTION

This invention relates to drive systems primarily for pedestrian controlled vehicles such as lawnmowers. Drive systems of the kind referred to require a forward drive at variable speed, a neutral condition and a reverse drive which desirably is at a lower speed than the forward drive, and preferably is also variable.

Hydrostatic drive systems are known comprising a hydraulic pump which supplies fluid to a motor. Such systems may be made to provide drive at variable speeds, for example by using a swash-plate pump and varying the angle of the swash-plate. If control valves are used it is possible to divert portions of the fluid flow to a reservoir, and reverse can be provided for example by valves interchanging connections. But all of such systems known to the applicants are too expensive for lawnmowers and the like.

The object of the invention is to provide improvements to meet these requirements.

Prior Patent GB 690528-A proposes using a gerotor pump and motor as a hydrostatic drive. A gerotor device has an internally lobed annulus, journalled for rotation about a first axis in a body, and a male lobed rotor with one less lobe is located in the annulus for rotation about a second and parallel axis. The rotor lobes contact the annulus lobes, or nearly contact them, and as the two parts rotate in the same direction but at different speeds, a series of chambers formed between the inter-lobe spaces rotate about the axes varying '(increasing) in volume in a first half revolution and decreasing in a second half revolution. In the first half revolution the chambers suck fluid e.g. from a reservoir and in the second half revolution expel the fluid to the motor to drive it.

According to the mentioned prior patent GB 690528A, the pump annulus is disposed in an eccentric ring in the body, and the eccentric ring can be moved and this has the effect of varying the eccentricity of the one axis relative to the other. As explained in the said patent, a 90° shift will reduce the pump from delivering full volume to a zero flow condition, and in a second and subsequent 90° shift the flow rate increases and reverses to equal and opposite effect.

SUMMARY OF THE INVENTION

According to the present invention, a hydrostatic drive comprises a gerotor pump having its annulus or its male lobed rotor but not both axially split into two separate parts of unequal length, and means are provided for angularly shifting one part relative to the other.

When the two parts are angularly aligned so that lobes on the one part are in the same angular position as lobes on the other part and the eccentricity of axes is extreme the pump may deliver full volume in one direction, and as the parts turn relative to one another the volume delivered by the pump will fall to zero and then as the movement continues, the flow direction will reverse up to a different maximum.

This is due to the unequal length of the parts which causes the maximum flow in one direction to be different from the maximum flow in the other direction for reasons which will be more particularly described hereafter, hence giving the possibility of a slower reverse drive than forward drive.

THE DRAWINGS

Whilst it is within the scope of the invention to move the annulus or rotor parts in opposite directions, simpler arrangements are possible particularly if the axially longer of the two parts is the one which is moved relative to the other.

One embodiment of the invention is now more particularly described with reference to the accompanying drawings wherein:

FIGS. 1–5 are diagrammatic views showing the positions of the gerotor parts in different positions of alignment;

DETAILED DESCRIPTION

Figure 6:
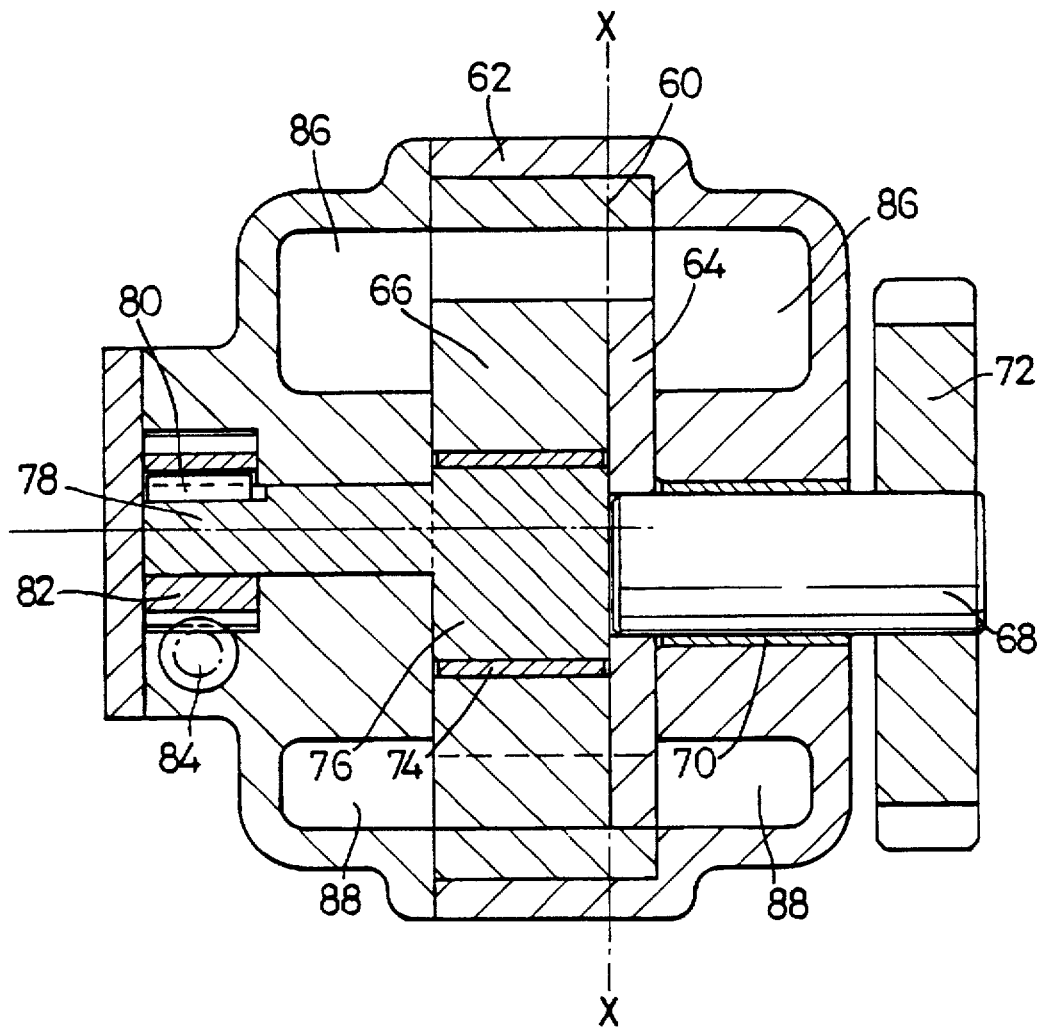
FIG. 6 is a sectional elevation of a gerotor pump forming part of a hydrostatic drive system.
Figure 7:
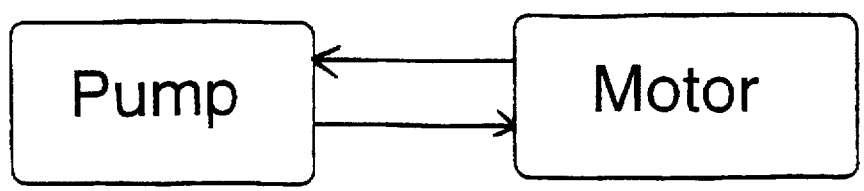
FIG. 7 is a diagrammatic view of a hydrostatic drive.

The hydrostatic drive system of the invention comprises a pump shown in FIGS. 1–7 and a motor shown in FIG. 7. There may be a conventional reservoir for hydraulic fluid, which is sucked from the reservoir by the pump and delivered to the motor, and returned from the motor to the reservoir. The motor may also be a gerotor pump but one of relatively simple construction having a single rotor and annulus and a pair of matched ports, generally similar to what is seen in FIG. 1 of the accompanying drawings.

The gerotor set shown in FIG. 1 comprises a single one-piece annulus 10 having (in this instance) six lobes, and rotor 12 which has five lobes. The rotor is journalled on axis 14 and the annulus on axis 24. A pair of ports 16, 18, open through end walls of a body which has a cylindrical cavity journalling the annulus 10 for rotation, and these ports open to a series of chambers formed between the lobes.

Considering FIG. 1 as showing a motor, the rotor will be a single one piece lobed member. If hydraulic fluid is supplied through port 16, it will drive the parts in the direction of the arrow A, and the interlobed chambers increase in volume in travelling through one half revolution passing over that port 16, and decrease in volume in the second half revolution passing over the port 18, through which the fluid exhausts. The plane PP contains the axes and separates the half revolutions.

It will be appreciated that the rotor is fast with shaft 20 journalled in the pump body, and that is the drive shaft to drive the lawnmower or other device powered by the hydrostatic system.

However, it would be within the scope of the invention to use different kinds of hydraulic motors.

Turning now to the pump which supplies the hydraulic fluid. Reference is initially made to FIG. 6 showing a cross section of the same. The pump comprises a single annulus 60 journalled in body 62 and, like the pump of FIG. 1 (in this instance) having six lobes. Within the annulus is a pair of axially arranged, i.e. end-to-end rotor parts 64,66 which in this instance have five lobes. Rotor 64 is fast with drive shaft 68, journalled in the bush 70, and carrying drive gear 72 for example connecting the shaft via a drive train to a prime mover which may typically be a battery powered electric motor, a mains powered electric motor, a petrol engine or the like. The prime mover would normally be driven at a constant speed or possibly a governed maximum speed, and uniform direction, with the final drive output from the pump being controlled by the hydrostatic system.

The rotor 66 is journalled on bush 74 carried by eccentric 76 fast with shaft 78 journalled in the pump body, and the shaft is arranged to be angularly turned. In this particular embodiment, the shaft 78 may be keyed at 80 to pinion 82 arranged to be turned by worm 84, or alternatively the pinion may be meshed with a rack extending tangentially. If a rack is used, it may be springloaded to one extreme position and displaced from that position for example by a Bowden wire control, operating linkage or the like, for example from a hand control on the handlebars of the lawnmower or like.

The pump body includes, in this instance, arcuate chambers 86,88 which communicate with the inter-chamber spaces via ports as will be hereinafter described. Chambers 86 will be connected for example to the reservoir and chambers 88 to the motor, or vice versa depending upon the direction of drive of the shaft 68.

Attention is particularly drawn to the axial length of the part 66 relative to the part 64. Essentially, one is longer than the other. In the illustrated embodiment, rotor 66 is four times the length of rotor 64, that is to say 80% of the rotor length is provided by part 66 and 20% by part 64. Other proportions are possible.

Considering now FIGS. 1 to 5, but regarding these as views of the pump and not (in the case of FIG. 1) of the motor. It will be appreciated that the annulus 60 in FIG. 6 is equivalent to the annulus 10 in FIG. 1, and the rotor 64, 66 is equivalent to the rotor 12 in FIG. 1. Shaft 68 is equivalent to shaft 20. The ports 16,18 open from chambers 86,88. In this regard FIG. 1 shows the two rotor parts aligned, that is to say in phase, so that their lobes are in the same angular relationship to one another.

Use of the pinion 82 enables the eccentric 76 to be rotated about its axis which is also the axis of rotation of the annulus. That is to say, the axis of shaft 78 is equivalent to the axis 24 in FIG. 1. The axis of shaft 68 is equivalent to axis 14 in FIG. 1. Moreover the axis of rotor 66 in FIGS. 1 and 6 is the same as rotor 64, i.e. lies on the point 14 in FIG. 1. However, as shaft 78 is turned, the axis of part 66 is displaced from being coincident with the point 14 in FIG. 1 and is swung through a series of positions indicated by the reference number 40 in FIGS. 2–5. It will be seen that in the movement from FIG. 1 to FIG. 5, which amounts to 180° shift of shaft 78, axis 40 moves from being coincident with 14 in FIG. 1 to being on the opposite side of axis 24 in FIG. 5. As it does so, the rotor parts are moved successively out of alignment.

The pump of FIG. 6 can be considered as having an aggregate output equivalent to that of two pumps, which are sometimes completely in phase or alignment as in FIG. 1, and at other times are in different degrees of non-alignment as in FIGS. 2–5. The two pumps are equivalent to that shown in FIG. 6 separated along the plane XX. The righthand part including rotor 64 and 20% of the length of the annulus has a maximum possible output in one direction which is one quarter of that available from the other notional pump part composed of the rotor 66 and the annulus part to the left of the plane XX because the one rotor and hence pump is four times the size of the other. Hence if they are both delivering full volume in the same direction, the output is 100% i.e. maximum. If they are both delivering full volume but in opposite directions, the net output of the illustrated pump will be 60% of maximum. Since it is the larger volume pump part which is variable in direction through angular shifting of the rotor axis, it follows that the 60% result will be in the opposite direction of flow to the 100% result i.e. in the one case 20% is in one direction and 80% is in the same direction so 20+80=100. In the other case 20% is in one direction and 80% is in the opposite direction so that 20−80=−60, or 60% flow volume but reverse direction. Hence, the hydrostatic drive will have a theoretical maximum drive speed, for example in forward drive, and a maximum drive in reverse which is only 60% of that in forward drive mode.

Moreover, it will be appreciated that in movement from maximum in one direction to the reduced maximum in the opposite direction, there will be a point where the delivered volume is zero. This amounts to a neutral position as far as the hydrostatic drive is concerned.

The means for turning the shaft 78 may be indexed, so as to provide convenient stop positions at for example at full speed and half speed in forward drive, and also in the neutral position.

Although the invention has been described with the annulus having one more lobe than the rotor, a greater difference in lobe numbers is possible, including the case when the annulus has two more lobes than the rotor, for example 7 lobes on the annulus and 5 on each of the rotor parts, but again, these numbers are purely illustrative.

I claim:

1. A hydrostatic drive comprising a gerotor pump supplying hydraulic fluid to a motor, said gerotor pump having an annulus member and a male lobed rotor member engaging one another, the male lobed rotor member being axially split into two end-to-end separate parts of unequal axial length with respect to the rotational axis of the male lobed rotor member, and means for angularly shifting one of said separate parts relative to the other.

2. A hydrostatic drive as claimed in claim 1 in which the axially shorter one of the two parts is journalled on a fixed axis and the axially longer one of the two parts is the angularly shiftable part.

3. A hydrostatic drive as claimed in claim 2 wherein said axially longer one of the parts is journalled on a bush carried on an eccentric shaft and including means for turning the shaft angularly.

4. A hydrostatic drive as claimed in any one of the preceding claims providing forward, neutral and reverse drive.

5. A hydrostatic drive comprising a gerotor pump for supplying hydraulic fluid to a motor, the gerotor pump having an annulus member and a male lobed rotor member engaging one another the male lobed rotor member being axially split into two end-to-end separate parts of unequal axial length with respect to the rotational axis of the male lobed rotor member, and means for angularly shifting one of said separate parts relative to the other.

6. The hydrostatic drive according to claim 5 wherein said one of said shiftable parts is the axially longer of said two separate parts.

* * * * *